United States Patent
Reiter

(10) Patent No.: US 12,503,198 B2
(45) Date of Patent: Dec. 23, 2025

(54) FASTENER ARRANGEMENT ON BICYCLE

(71) Applicant: Specialized Bicycle Components, Inc., Morgan Hill, CA (US)

(72) Inventor: Jonas Reiter, Zug (CH)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 122 days.

(21) Appl. No.: 17/481,481

(22) Filed: Sep. 22, 2021

(65) Prior Publication Data

US 2022/0001957 A1 Jan. 6, 2022

Related U.S. Application Data

(63) Continuation of application No. 16/448,845, filed on Jun. 21, 2019, now Pat. No. 11,155,320.

(51) Int. Cl.
| | |
|---|---|
| *B62K 19/24* | (2006.01) |
| *B62J 11/00* | (2020.01) |
| *B62K 19/30* | (2006.01) |
| *B62M 6/40* | (2010.01) |
| *B62M 6/55* | (2010.01) |
| *B62M 9/126* | (2010.01) |
| *B62K 3/02* | (2006.01) |

(52) U.S. Cl.
CPC ............ *B62M 9/126* (2013.01); *B62J 11/00* (2013.01); *B62K 19/30* (2013.01); *B62M 6/40* (2013.01); *B62K 3/02* (2013.01)

(58) Field of Classification Search
CPC ........... B62K 19/24; B62M 6/40; B62M 6/50; B62M 6/55
USPC ....... 180/206.1, 206.3, 206.4, 208, 227, 228
See application file for complete search history.

(56) References Cited

U.S. PATENT DOCUMENTS

| | | | | |
|---|---|---|---|---|
| 4,412,597 | A * | 11/1983 | Aiba | B62M 7/02 248/596 |
| 7,976,047 | B2 * | 7/2011 | Ishida | B62K 19/38 180/227 |
| 8,186,636 | B2 | 5/2012 | Carnevali | |
| 10,300,985 | B2 | 5/2019 | Mano | |
| 2007/0041808 | A1 | 2/2007 | Iwata | |
| 2012/0051869 | A1 | 3/2012 | Johansen | |
| 2015/0152906 | A1 | 6/2015 | Lai et al. | |

(Continued)

FOREIGN PATENT DOCUMENTS

| | | |
|---|---|---|
| CN | 204587213 U | 8/2015 |
| DE | 102017201617 A1 | 8/2018 |

(Continued)

OTHER PUBLICATIONS

Haibike, "XDURO AllMtn 3.0" <https://www.haibike.com/de/de/ebikes/emountainbikes/all-mountain/xduro-allmtn-30-de840?id=4541030941>, publication date unknown.

(Continued)

*Primary Examiner* — Anne Marie M Boehler
(74) *Attorney, Agent, or Firm* — Michael Best & Friedrich LLP

(57) ABSTRACT

An e-bike includes a frame assembly, wheels supporting the frame assembly, a motor assembly coupled to the frame assembly by a motor fastener having a hollow portion, and an accessory component coupled to the frame assembly by an accessory fastener positioned at least partially in the hollow portion of the motor fastener.

20 Claims, 10 Drawing Sheets

(56) References Cited

U.S. PATENT DOCUMENTS

| | | | |
|---|---|---|---|
| 2017/0016526 A1* | 1/2017 | Watarai | F16H 57/025 |
| 2018/0072380 A1 | 3/2018 | Talavasek et al. | |
| 2018/0229793 A1 | 8/2018 | Cody et al. | |
| 2019/0283838 A1 | 9/2019 | Thumm | |
| 2019/0309790 A1 | 10/2019 | Preuss | |
| 2020/0386258 A1 | 12/2020 | Size, Jr. | |

FOREIGN PATENT DOCUMENTS

| | | |
|---|---|---|
| DE | 102018106946 A1 | 10/2018 |
| JP | H10167160 A1 | 6/1998 |

OTHER PUBLICATIONS

Holland Bike Shop, <https://hollandbikeshop.com/img/prod/shimano-verschlussring-fur-du-e8000-e-mtb-4524667880974-1-1.jpg>, publication date unknown.

International Search Report and Written Opinion for Application No. PCT/US2020/038668 dated Nov. 13, 2020 (18 pages).

Invitation to Pay Additional Fees issued for Application No. PCT/US2020/038668 dated Sep. 21, 2020 (13 bages).

Rotwild, "Enduro R.E+" <https://www.rotwild.com/bikes-stuff/bikes/enduro/re/ultra/>, 2019.

European Patent Office Extended Search Report for Application No. 23198185.3 dated Dec. 18, 2023 (6 pages).

\* cited by examiner

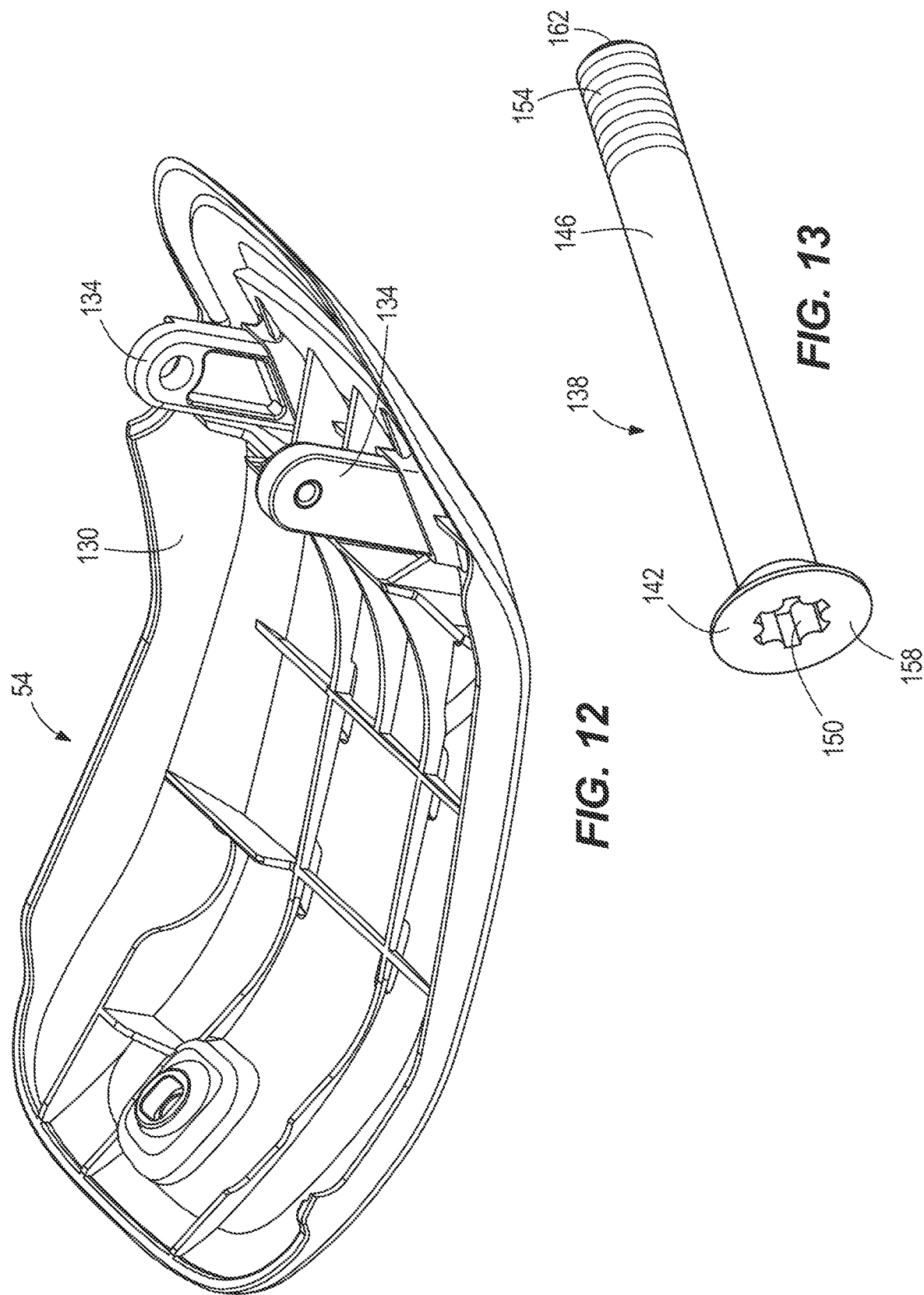

FASTENER ARRANGEMENT ON BICYCLE

CROSS-REFERENCE TO RELATED APPLICATIONS

This application is a continuation of U.S. application Ser. No. 16/448,845, filed Jun. 21, 2019, the entire contents of which are fully incorporated herein by reference.

BACKGROUND

The present invention relates generally to the field of bicycles, and specifically to fasteners that are used on bicycles to couple together different components of the bicycles.

Bicycles commonly include components that are fixed in place with one or more fasteners, and it may be desirable for the components to align to minimize visual gaps and/or enhance function. For example, an electric bicycle ("e-bike") may include a motor assembly and one or more accessory components (e.g., a chainguide, etc.) that are fixed to a frame of the e-bike with one or more fasteners (e.g., bolts). However, dimensions of the frame of a bicycle can be difficult to keep under control due to deformation during welding and/or frame alignment. Additionally, placing a component (e.g., a motor assembly) in a specific orientation within a particular bicycle size and frame can further add to the complexity and difficulty of properly aligning multiple components. If components (e.g., the motor assembly and accessory component(s) of an e-bike) are improperly aligned, a tolerance stack-up may lead to misalignment of other components, insufficient or undesirable function, and/or undesirable aesthetics. Additionally, incorporating threads into a frame of a bicycle can add manufacturing and/or repair complexity and/or costs, as the threads can be damaged during manufacturing processes like sandblasting or repair processes, and are often not reworkable or replaceable on a completed bicycle. Finally, accessing the fasteners on bicycles, especially on a drive side of an e-bike, can require first disassembling a portion or portions the bicycle, as the fasteners may be covered by other components.

BRIEF DESCRIPTION OF THE DRAWINGS

FIG. 12 is a perspective view of a rockguard of the e-bike of FIG. 1 visible in the cross-section of FIG. 11.

FIG. 13 is a perspective view of a rockguard fastener of the e-bike of FIG. 1 visible in the cross-section of FIG. 11.

DETAILED DESCRIPTION

Some embodiments include an e-bike. The e-bike can include a frame assembly, wheels supporting the frame assembly, a motor assembly coupled to the frame assembly by a motor fastener having a hollow portion, and an accessory component coupled to the frame assembly by an accessory fastener positioned at least partially in the hollow portion of the motor fastener.

Other embodiments include an e-bike. The e-bike can include a frame assembly having a first frame mount and a second frame mount spaced from the first frame mount. The e-bike further can include wheels supporting the frame assembly and a motor assembly. The motor assembly can include a first motor mount aligned with the first frame mount and a second motor mount aligned with the second frame mount. Further, the motor assembly can be coupled to the frame assembly by a first motor fastener securing the first frame mount to the first motor mount and by a second motor fastener securing the second frame mount to the second motor mount. Meanwhile, the second motor fastener can include a drive feature. Additionally, the first motor fastener and the second motor fastener can be configured such that, when the first motor fastener is removed from the first motor mount and the second motor fastener is securing the second frame mount to the second motor mount, the drive feature is accessible through a hollow interior of the first motor mount.

Other embodiments include a fastener. The fastener can include a body including a hollow portion. The hollow portion can be at least partially defined by an internal surface having internal threads. Further, the fastener can include an external surface having external threads.

Other elements will become apparent by consideration of the detailed description and drawings.

Before any embodiments are explained in, it is detail to be understood that the invention is not limited in its application to the details of construction and the arrangement of components set forth in the following description or illustrated in the following drawings. The invention is capable of other embodiments and of being practiced or of being carried out in various ways.

Figure 1:
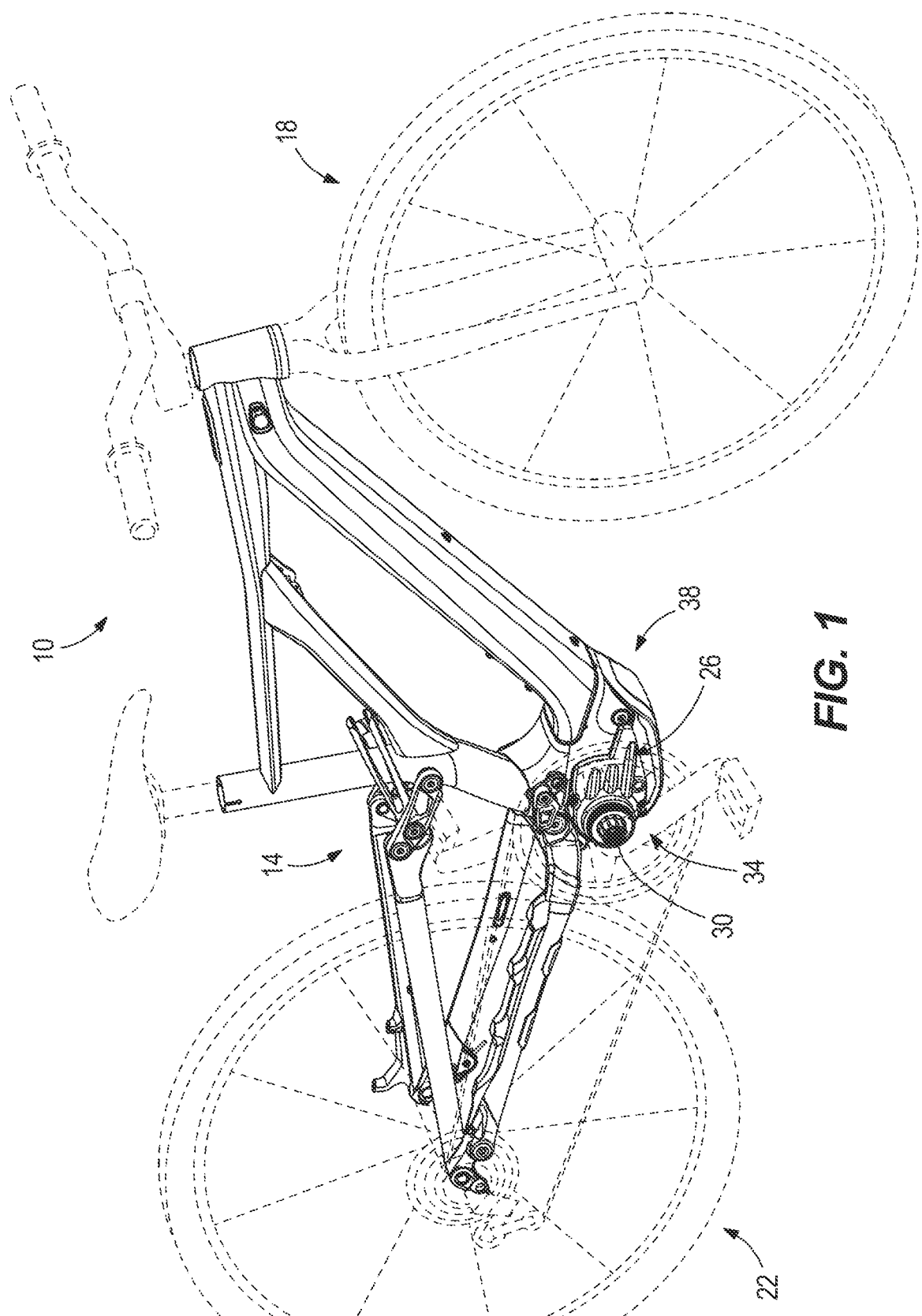
FIG. 1 is a perspective view of an e-bike, according to an embodiment.

Referring to the drawings, FIG. 1 is a perspective view of an electric bicycle ("e-bike") 10, according to an embodiment. In many embodiments, e-bike 10 can comprise a pedal-assist e-bike and/or a power-on-demand e-bike. In some embodiments, e-bike 10 can comprise a pedal-assist e-bike and not a power-on-demand e-bike, or vice versa.

In many embodiments, the e-bike 10 includes a frame assembly 14, a first wheel 18 coupled to and supporting the frame assembly 14, and a second wheel 22 coupled to and supporting the frame assembly 14. The e-bike 10 also includes a motor assembly 26 coupled to the frame assembly 14. The motor assembly 26 can be operable to provide motive power to the e-bike 10. For example, the motor assembly 26 can include an electric motor. The electric motor can generate motive power from electricity supplied to the electric motor, such as, for example, by a battery of the e-bike 10. In many embodiments, and as illustrated in FIG. 1, the motor assembly 26 can be located generally at a lower portion of the frame assembly 14 and the e-bike 10, although in other embodiments, the motor assembly 26 can be located elsewhere at the frame assembly 14 and the e-bike 10.

In many embodiments, the motor assembly 26 can include a motor output shaft 30. Further, the motor output shaft 30 can be configured to revolve in order to provide motive power to the e-bike 10. For example, the motor output shaft 30 can turn a sprocket (e.g., via a spider) of a drivetrain of e-bike 10.

In some embodiments, the motor output shaft 30 can extend laterally away from the e-bike 10 on a drive side 34 of the e-bike 10. The drive side 34 can be located opposite a non-drive side 38 of the e-bike 10. In some embodiments, and as illustrated in FIG. 1, the motor output shaft 30 can be splined, and can be coupled, for example, to a sprocket (e.g., via a spider) or other component of the e-bike 10. In other embodiments, other configurations (e.g., sizes, shapes, etc.) of motor output shaft 30 can be implemented.

Figure 2:
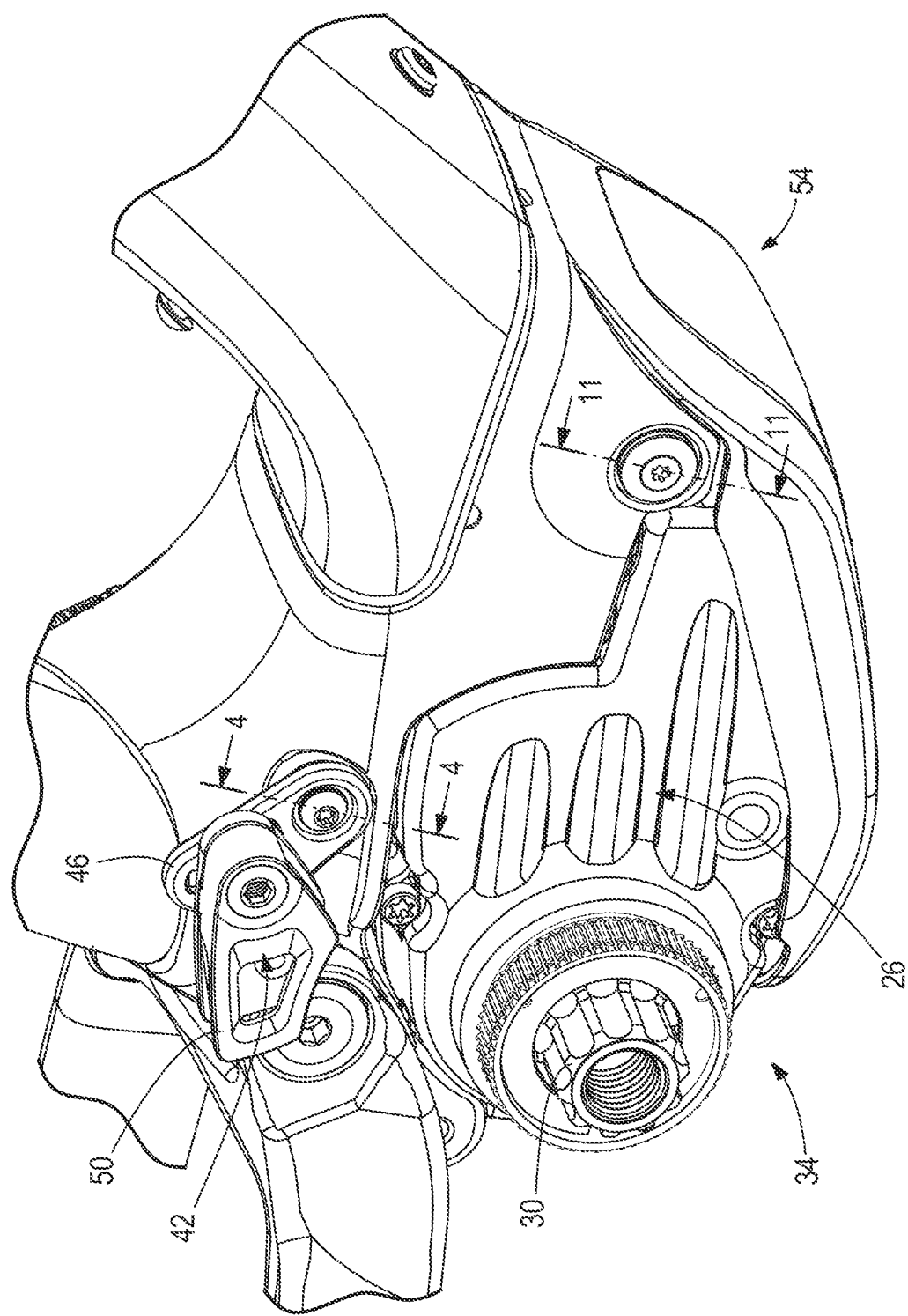
FIG. 2 is an enlarged view of a lower portion of the e-bike of FIG. 1, illustrating a drive side of the e-bike.

Referring now to FIG. 2, in many embodiments, the e-bike 10 can include one or more accessory components. In many embodiments, the accessory component(s) can comprise one or more component(s) configured to be used in connection with the motor assembly 26 and/or a drivetrain of the e-bike 10.

For example, in some embodiments, the accessory component(s) of the e-bike 10 can include a chainguide 42 located on the drive side 34. The chainguide 42 can include a mounting portion 46 and a guide portion 50 that extends from the mounting portion 46. The chainguide 42, and in particular the guide portion 50, can serve to guide a chain of a drivetrain of the e-bike 10. In other embodiments, the chainguide 42 can have a shape, size, and/or location other than that illustrated. Some embodiments of the e-bike 10 can include one or more additional chainguides, which can be similar or identical to chainguide 42. In other embodiments, the chainguide 42 can be omitted.

With continued reference to FIG. 2, in some embodiments, the accessory component(s) of the e-bike 10 can include a rockguard 54. The rockguard 54 can be located generally underneath the motor assembly 26 and in a position to protect the motor assembly 26. For example, the rockguard 54 can be positioned to deflect rocks or other debris away from the motor assembly 26. In other embodiments, the rockguard 54 can have a shape, size, and/or location other than that illustrated. Some embodiments of the e-bike 10 can include one or more additional rockguards, which can be similar or identical to rockguard 54. In other embodiments, the rockguard 54 can be omitted.

In many embodiments, one or more of the accessory component(s) of the e-bike 10 can be coupled to both the frame assembly 14 and to the motor assembly 26 with at least one combination of an accessory fastener and a motor fastener. As discussed in greater detail herein, the accessory fastener and the motor fastener can be arranged in a fastener-within-fastener arrangement (e.g., a nested arrangement). In many embodiments, implementing the fasteners in fastener-within-fastener arrangements can have numerous advantages. For example, in some embodiments, implementing fasteners in fastener-within-fastener arrangements can help to align the motor assembly 26 and the accessory component(s) of the e-bike 10 with each other and with the frame assembly 14, and as a result, misalignment of other components, insufficient or undesirable function, and/or undesirable aesthetics of the e-bike 10 can be mitigated or avoid. In these or other embodiments, implementing the fasteners in fastener-within-fastener arrangements can help to reduce manufacturing and/or repair complexity and/or costs of the e-bike 10, such as, for example, by reducing threading in the frame assembly 14. In these or other embodiments, implementing the fasteners in fastener-within-fastener arrangements may permit better access to one or more of the fasteners, especially on the drive side 34 of the e-bike 10.

Figure 4:
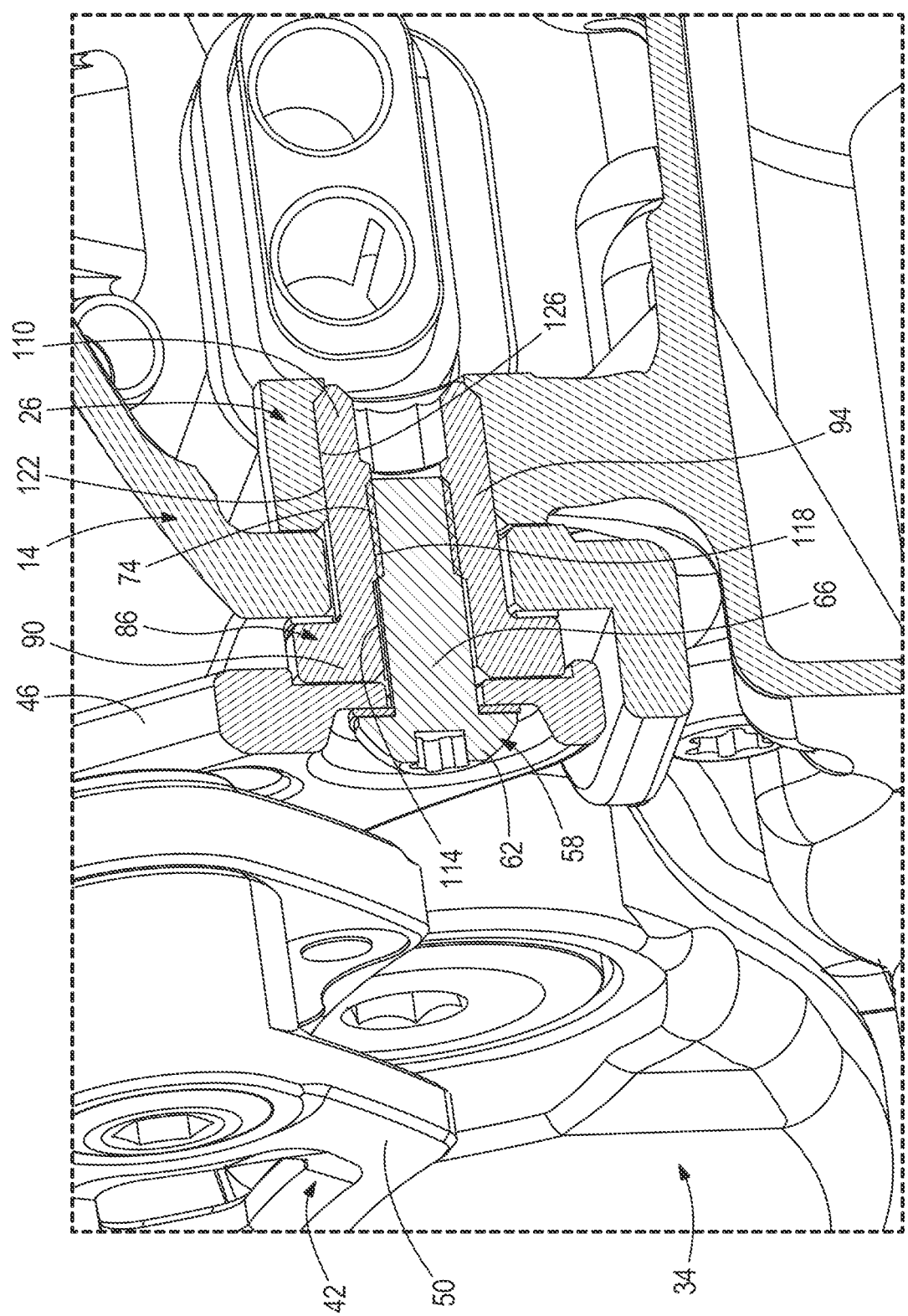
FIG. 4 is a cross-sectional view of the e-bike of FIG. 1, taken along lines 4-4 in FIG. 2.
Figure 5:
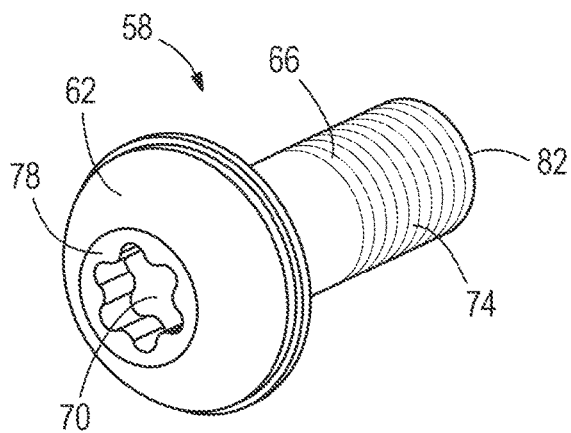
FIGS. 5 and 6 are perspective views of a chainring fastener of the e-bike of FIG. 1 visible in the cross-section of FIG. 4.
Figure 6:
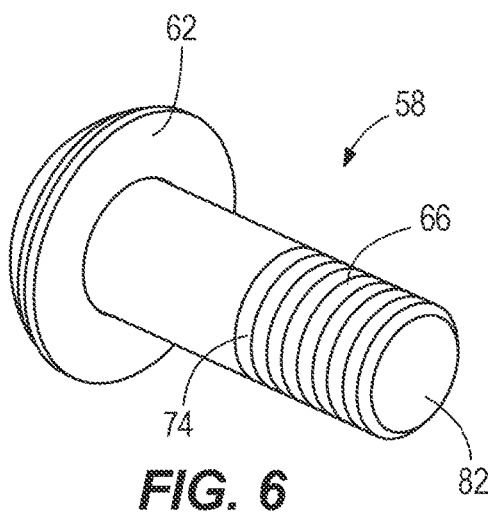

For example, referring to FIGS. 4-6, in many embodiments, the e-bike 10 can include an accessory fastener 58 that is used to fix the chainguide 42 in place. The accessory fastener 58 can include a head 62 and an elongate body 66 extending from the head 62. In some embodiments, the head 62 can include a drive feature 70 configured to facilitate rotation of the accessory fastener 58. In some embodiments, the drive feature 70 can be configured to receive a tool operable to rotate the accessory fastener 58. For example, the tool can be sized and shaped similarly to the drive feature 70 to permit the tool to engage the drive feature 70. As illustrated at FIG. 5, in some embodiments, the drive feature 70 can include a recessed 6-lobed internal poly-lobular drive feature. However, in other embodiments, the drive feature 70 can include any other suitably shaped drive feature (e.g., an internal polygon drive feature, an internal poly-lobular drive feature, etc.) able to receive a tool operable to rotate the accessory fastener 58. Further, in these or still other embodiments, the drive feature 70 can protrude rather than recess. As illustrated in FIG. 4, in many embodiments, in an assembled state, the head 62 can be located outside of and pressed against the mounting portion 46 of the chainguide 42. The accessory fastener 58 can include an external thread 74 along at least a portion of the elongate body 66. In many embodiments, the drive feature 70 can be located at a first end 78 (FIG. 5) of the accessory fastener 58, and the external thread 74 can be located at a second end 82 (FIG. 6) of the accessory fastener 58 opposite the first end 78.

Figure 7:
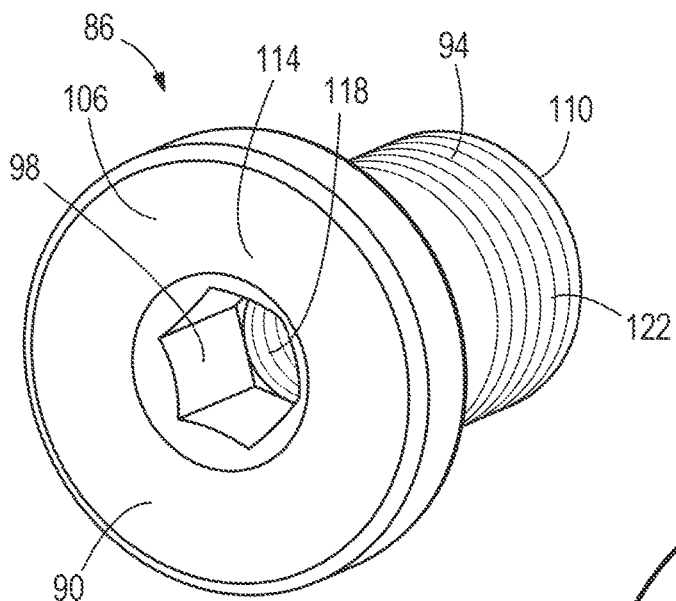
FIGS. 7 and 8 are perspective views of a motor fastener of the e-bike of FIG. 1 visible in the cross-section of FIG. 4.
Figure 8:
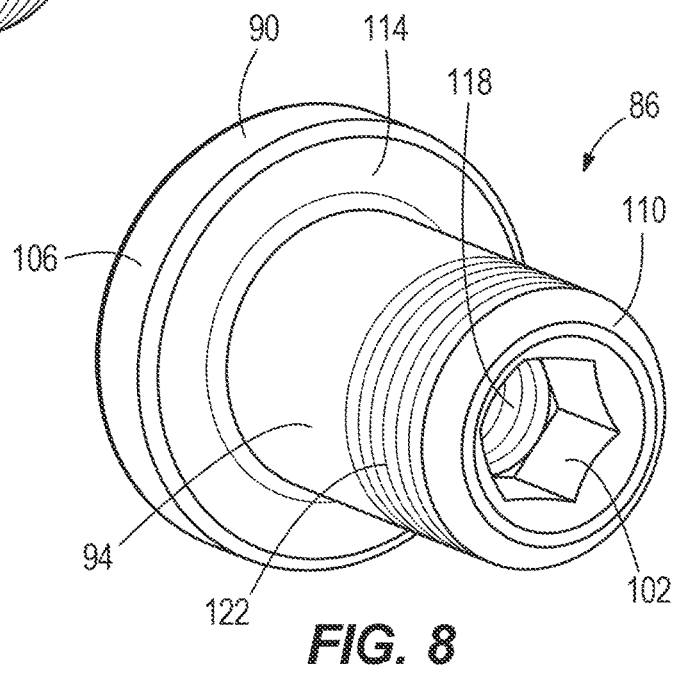

Referring to FIGS. 4, 7, and 8, the e-bike 10 can include a motor fastener 86 that is used to mount the motor assembly 26 to the frame assembly 14. The motor fastener 86 also can be used to fix the chainguide 42 in place. The motor fastener 86 can include a head 90 and an elongate body 94 extending from the head 90. As illustrated in FIG. 7, in many embodiments, the head 90 can include a first drive feature 98 configured to facilitate rotation of the motor fastener 86. In some embodiments, the first drive feature 98 can be similar to the drive feature 70. As illustrated at FIG. 7, in some embodiments, the first drive feature 98 can include a recessed 6-sided internal polygon drive feature (e.g., an internal hex drive feature). However, in other embodiments, the first drive feature 98 can include any other suitably shaped drive feature (e.g., an internal polygon drive feature, an internal poly-lobular drive feature, etc.) able to receive a tool operable to rotate the motor fastener 86. Further, in these or still other embodiments, the first drive feature 98 can protrude rather than recess.

In many embodiments, the elongate body 94 can include a second drive feature 102 (e.g., backside drive) configured to facilitate rotation of the motor fastener 86. In some embodiments, the second drive feature 102 can be similar to the drive feature 70 or the first drive feature 98. As illustrated at FIG. 7, in some embodiments, the second drive feature 102 can include a recessed 6-sided internal polygon drive feature. However, in other embodiments, the second drive feature 102 can include any other suitably shaped drive feature (e.g., an internal polygon drive feature, an internal poly-lobular drive feature, etc.) able to receive a tool operable to rotate the motor fastener 86. Further, in these or still other embodiments, the second drive feature 102 can protrude rather than recess. As illustrated in FIGS. 7 and 8, in many embodiments, the first drive feature 98 can be located generally at or near a first end 106 of the motor fastener 86, and the second drive feature 102 can be located generally at or near a second end 110 of the motor fastener 86 opposite the first end 106. By incorporating both the first drive feature 98 and the second drive feature 102, the motor fastener 86 can be accessed and rotated from both the drive side 34 and the non-drive side 38 of the e-bike 10. In some embodiments, one of the first drive feature 98 or the second drive feature 102 can be omitted.

With continued reference to FIGS. 4, 7, and 8, the motor fastener 86 can include a hollow portion 114. In many embodiments, the hollow portion 114 can extend axially through the entire motor fastener 86 and can be defined in part by the recesses of the first drive feature 98 and/or the second drive feature 102. In other embodiments, the hollow portion 114 does not extend entirely through the motor fastener 86, and instead is divided into two separate hollow portions, one that includes the recess of the first drive feature 98 and another that includes the recess of the second drive feature 102. In many embodiments, the hollow portion 114 is sized and shaped to receive the elongate body 66 of the accessory fastener 58. As illustrated in FIG. 4, in many embodiments, the motor fastener 86 can include an internal thread 118 in the hollow portion 114, such that when the accessory fastener 58 is inserted into the motor fastener 86, the external thread 74 of the accessory fastener 58 threads to the internal thread 118 of the motor fastener 86. In some embodiments, the first drive feature 98 and/or the second drive feature 102 can have larger diameters or widths than an inner diameter of the internal thread 118. In other embodiments, the internal thread 118 can be omitted. In these embodiments, the accessory fastener 58 can pass through the hollow portion 114, and instead be threaded to another component or portion of the e-bike 10, such as, for example, the frame assembly 14 (FIG. 1).

With continued reference to FIG. 4, the motor fastener 86 can include an external thread 122 generally at or near the second end 110 of the motor fastener 86. In many embodiments, when the motor fastener 86 is inserted through the frame assembly 14, the external thread 122 can thread to an internal thread 126 of the motor assembly 26. In some embodiments, the first drive feature 98 can have a diameter or width smaller than an outer diameter of the external thread 122.

Figure 9:
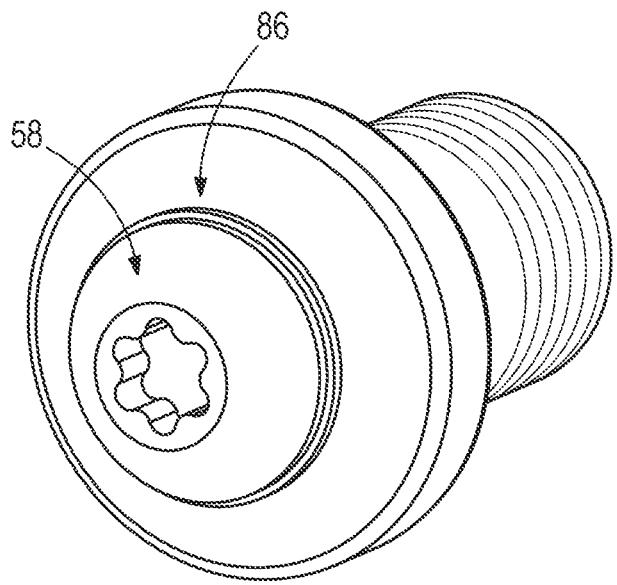
FIGS. 9 and 10 are perspective views of the chainring fastener of FIGS. 5 & 6 extending into and being threaded to the motor fastener of FIGS. 7 and 8.
Figure 10:
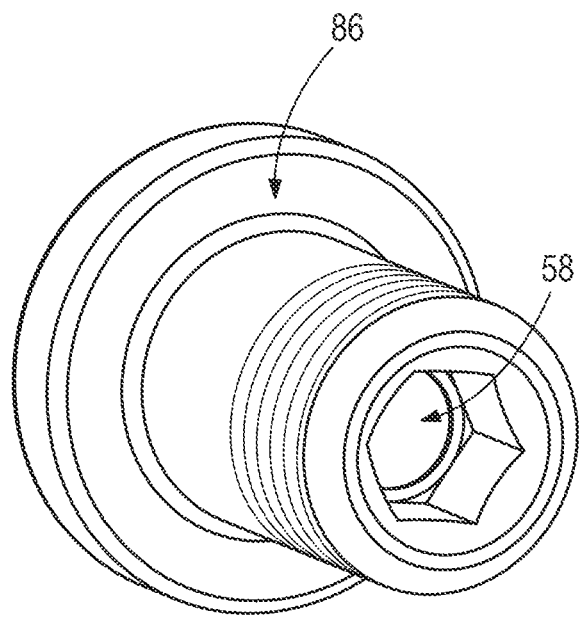

Referring to FIGS. 4, 9, and 10, in many embodiments, the motor fastener 86 and the accessory fastener 58 can form a fastener-within-fastener arrangement when fully installed. For example, this arrangement can advantageously permit the frame assembly 14 to be devoid of any threads in this area of the e-bike 10. Instead, the motor fastener 86 can thread to the motor assembly 26 to secure the motor assembly 26 to the frame assembly 14, and the accessory fastener 58 can thread to the inside of the motor fastener 86 to secure the chainguide 42 in place relative to the frame assembly 14 and the motor assembly 26. A stripped thread during use can advantageously be fixed by replacing motor fastener 86 or accessory fastener 58 and without having to replace the full frame assembly 14. As a result, implementing the e-bike 10, the motor fastener 86, and the accessory fastener 58 can reduce costs and/or complexity of manufacturing and/or repair.

Referring to FIGS. 11-17, in many embodiments, the rockguard 54 can be secured in place with a fastener-within-fastener arrangement. In some embodiments, this arrangement can be similar to the arrangement described above with respect to motor fastener 86 and accessory fastener 58. For example, in some embodiments, referring to FIGS. 11 and 12, the rockguard 54 can include a main body 130 and two projecting elements 134 that extend upwardly from the main body 130, either integrally as a single piece or as separate elements coupled to the main body 130. In an assembled state, the two projecting elements 134 can extend upwardly into an interior space defined by the motor assembly 26.

In many embodiments, the e-bike 10 can include an accessory fastener 138 that can be used to fix the rockguard 54 in place. In many embodiments, the accessory fastener 138 can include a head 142 and an elongate body 146 extending from the head 142. Referring to FIG. 13, the head 142 includes a drive feature 150 to facilitate rotation of the accessory fastener 138. In some embodiments, the drive feature 150 can be similar to the drive feature 70, the first drive feature 98, or the second drive feature 102. As illustrated at FIG. 13, in some embodiments, the drive feature 102 can include a recessed 6-sided internal poly-lobular drive feature. However, in other embodiments, the second drive feature 102 can include any other suitably shaped drive feature (e.g., an internal polygon drive feature, an internal poly-lobular drive feature, etc.) able to receive a tool operable to rotate the accessory fastener 138. Further, in these or still other embodiments, the drive feature 150 can protrude rather than recess. The accessory fastener 138 can include an external thread 154 along at least a portion of the elongate body 146. In some embodiments, the drive feature 150 can be located at a first end 158 of the accessory fastener 138, and the external thread 154 can be located at a second end 162 of the accessory fastener 138 opposite the first end 158.

Referring again to FIG. 11, one of the projecting elements 134 of the rockguard 54 can include a threaded insert having an internal thread 166. In some embodiments, the threaded insert can be co-molded or formed into the projecting element 134. In an assembled state, the external thread 154 of the accessory fastener 138 can be threaded to the internal thread 166 of the one of the projecting elements 134.

Figure 14:
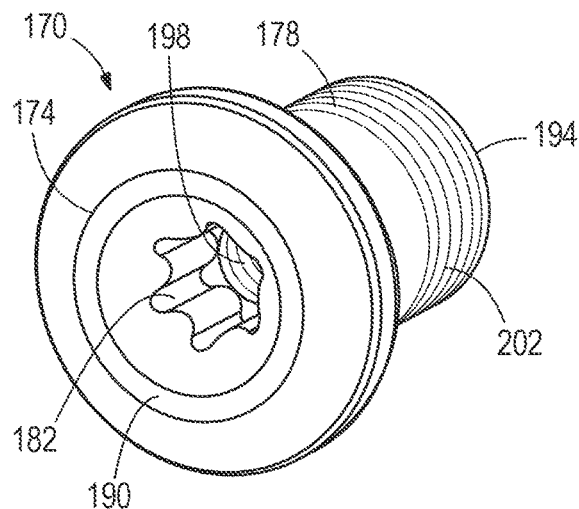
FIGS. 14 and 15 are perspective views of a motor fastener of the e-bike of FIG. 1 visible in the cross-section of FIG. 11.

In many embodiments, the e-bike 10 can include a motor fastener 170 securing the motor assembly 26 to the frame assembly 14. The motor fastener 170 can include a head 174 and an elongate body 178 extending from the head 174. As illustrated in FIG. 14, the head 174 can include a first drive feature 182 to facilitate rotation of the motor fastener 170. In some embodiments, the first drive feature 182 can be similar to the drive feature 70, the first drive feature 98, the second drive feature 102, or the drive feature 150. As illustrated at FIG. 14, in some embodiments, the first drive feature 182 can include a recessed 6-sided internal poly-lobular drive feature. However, in other embodiments, the first drive feature 182 can include any other suitably shaped drive feature (e.g., an internal polygon drive feature, an internal poly-lobular drive feature, etc.) able to receive a tool operable to rotate the motor fastener 170. Further, in these or still other embodiments, the first drive feature 182 can protrude rather than recess.

Figure 15:
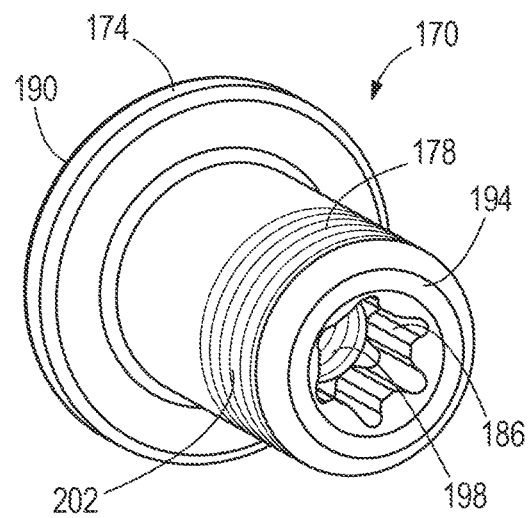

Referring to FIG. 15, in many embodiments, the elongate body 178 can include a second drive feature 186 to facilitate rotation of the motor fastener 170. In some embodiments, the second drive feature 186 can be similar to the drive feature 70, the first drive feature 98, the second drive feature 102, the drive feature 150, or the first drive feature 182. As illustrated at FIG. 14, in some embodiments, the second drive feature 186 can include a recessed 6-sided internal poly-lobular drive feature. However, in other embodiments, the second drive feature 186 can include any other suitably shaped drive feature (e.g., an internal polygon drive feature, an internal poly-lobular drive feature, etc.) able to receive a tool operable to rotate the motor fastener 170. Further, in these or still other embodiments, the first drive feature 182 can protrude rather than recess.

Referring to FIGS. 14 and 15, in many embodiments, the first drive feature 182 can be located generally at or near a first end 190 of the motor fastener 170, and the second drive feature 186 can be located at or near a second end 194 of the motor fastener 170 opposite the first end 190. By implementing both the first drive feature 182 and the second drive feature 186, in some embodiments, it can be possible to access and rotate the motor fastener 170 from both the drive side 34 and the non-drive side 38 of the e-bike 10.

Figure 11:
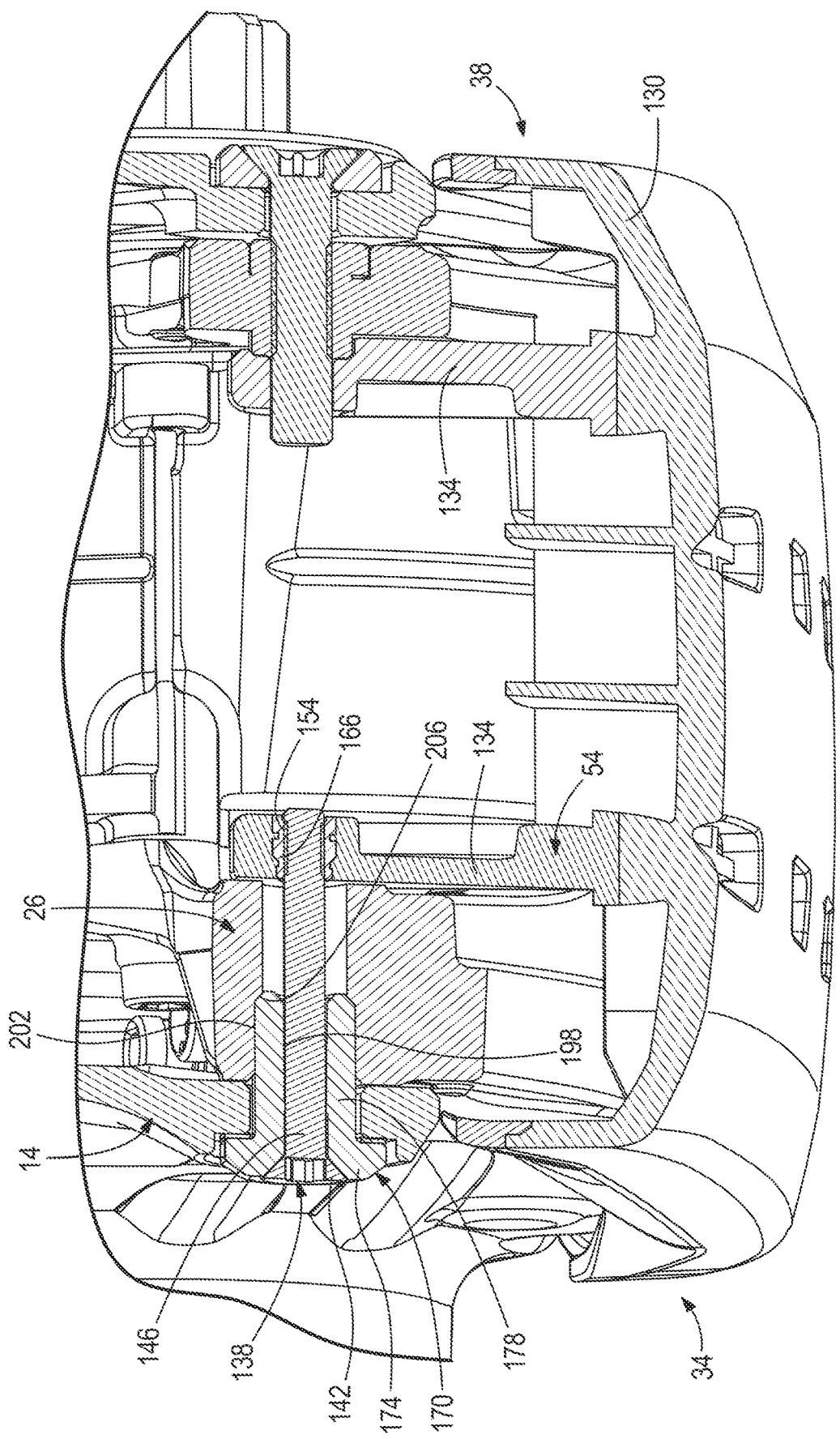
FIG. 11 is a cross-sectional view of the e-bike of FIG. 1, taken along lines 11-11 in FIG. 2.

Referring now to FIGS. 11, 14, and 15, the motor fastener 170 can include a hollow portion 198. In many embodiments, the hollow portion 198 can extend axially through the entire motor fastener 170 and can be defined at least in part by the recesses of the first drive feature 182 and the second drive feature 186. Further, the hollow portion 198 can be sized and shaped to receive the elongate body 146 of the accessory fastener 138. In many embodiments, and as illustrated in FIG. 11, the motor fastener 170 can be devoid of any internal thread at the hollow portion 198, such that the elongate body 146 of the accessory fastener 138 may extend entirely through the hollow portion 198. In other embodiments, the hollow portion 198 can include an internal thread that threads, for example, to a portion of the accessory fastener 138.

With continued reference to FIGS. 11, 14, and 15, the motor fastener 170 can include an external thread 202 along the elongate body 178, and generally at or near the second end 194 of the motor fastener 170. In many embodiments, and as illustrated in FIG. 11, when the motor fastener 170 is inserted through the frame assembly 14, the external thread 202 can be threaded to an internal thread 206 of the motor assembly 26.

Figure 16:
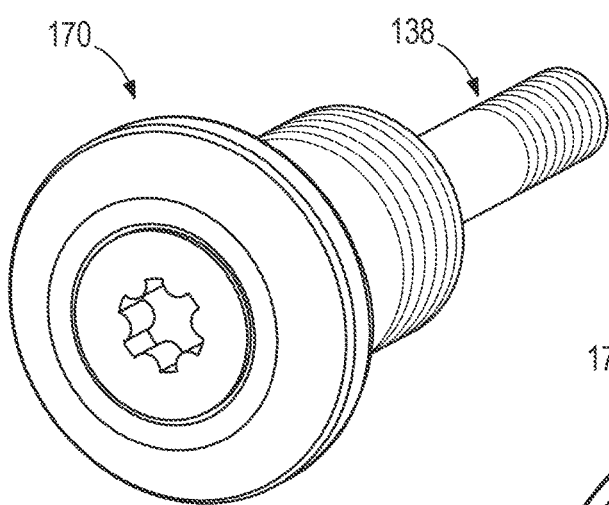
FIGS. 16 and 17 are perspective views of the rockguard fastener of FIG. 13 extending into and being fastened to the motor fastener of FIGS. 14 and 15.
Figure 17:
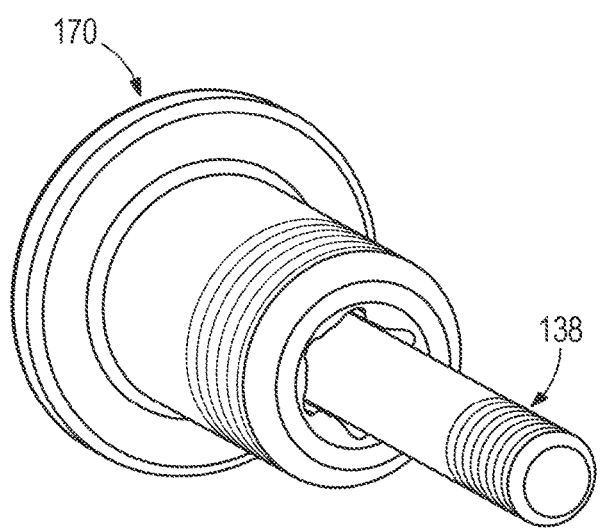

Referring now to FIGS. 11, 16, and 17, the motor fastener 170 and the accessory fastener 138 can form a fastener-within-fastener arrangement on the e-bike 10. In many embodiments, this arrangement can allow the frame assembly 14 to be devoid of any threads in this area of the e-bike 10. Instead, the motor fastener 170 can thread to the motor assembly 26 to secure the motor assembly 26 to the frame assembly 14, and the accessory fastener 138 can thread to the inside of one of the projecting elements 134 of the rockguard 54 to secure the rockguard 54 in place relative to the frame assembly 14 and the motor assembly 26. A stripped thread can thereby be fixed without replacing the full frame assembly 14.

Figure 3:
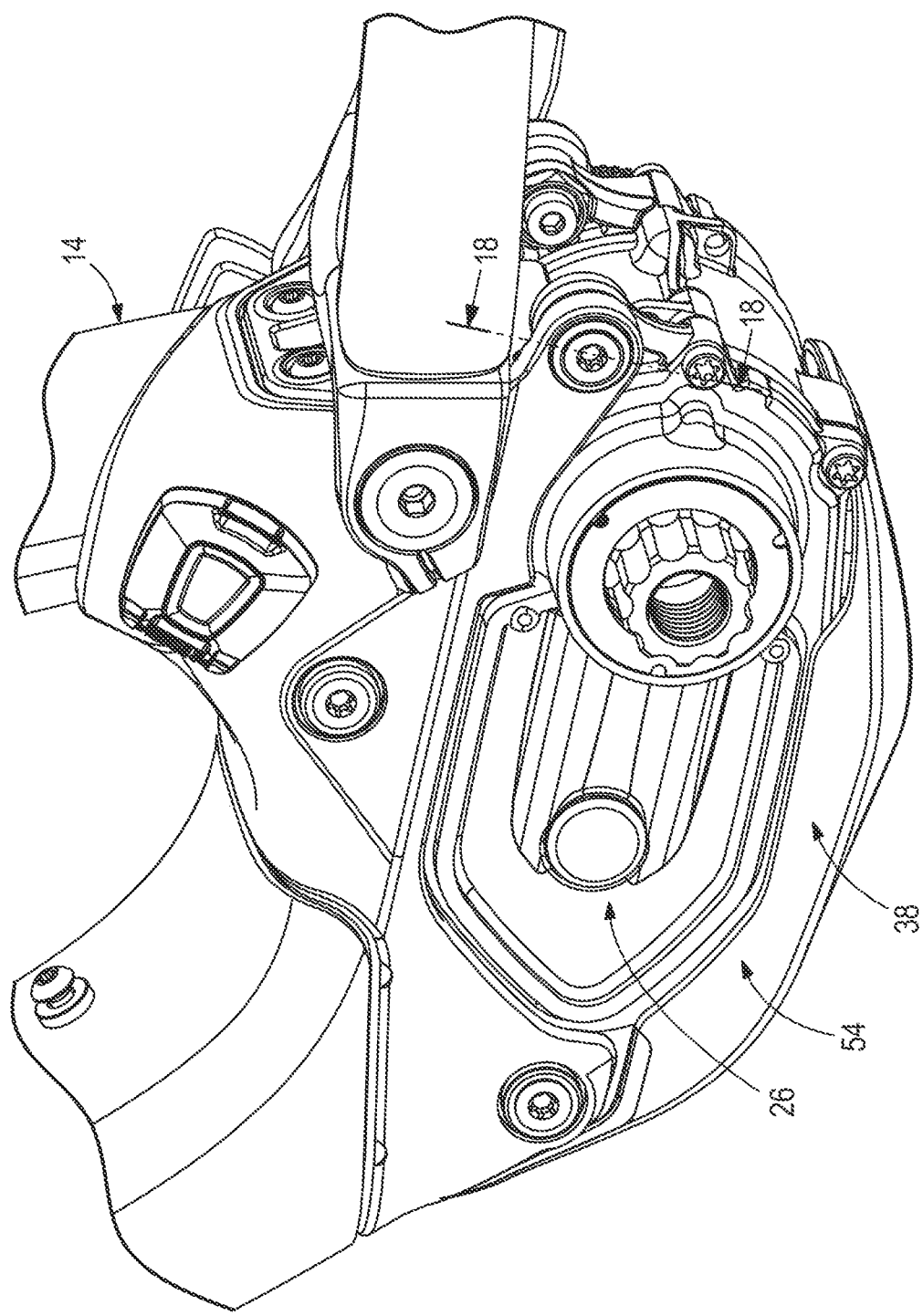
FIG. 3 is an enlarged view of a lower portion of the e-bike of FIG. 1, illustrating a non-drive side of the e-bike.
Figure 18:
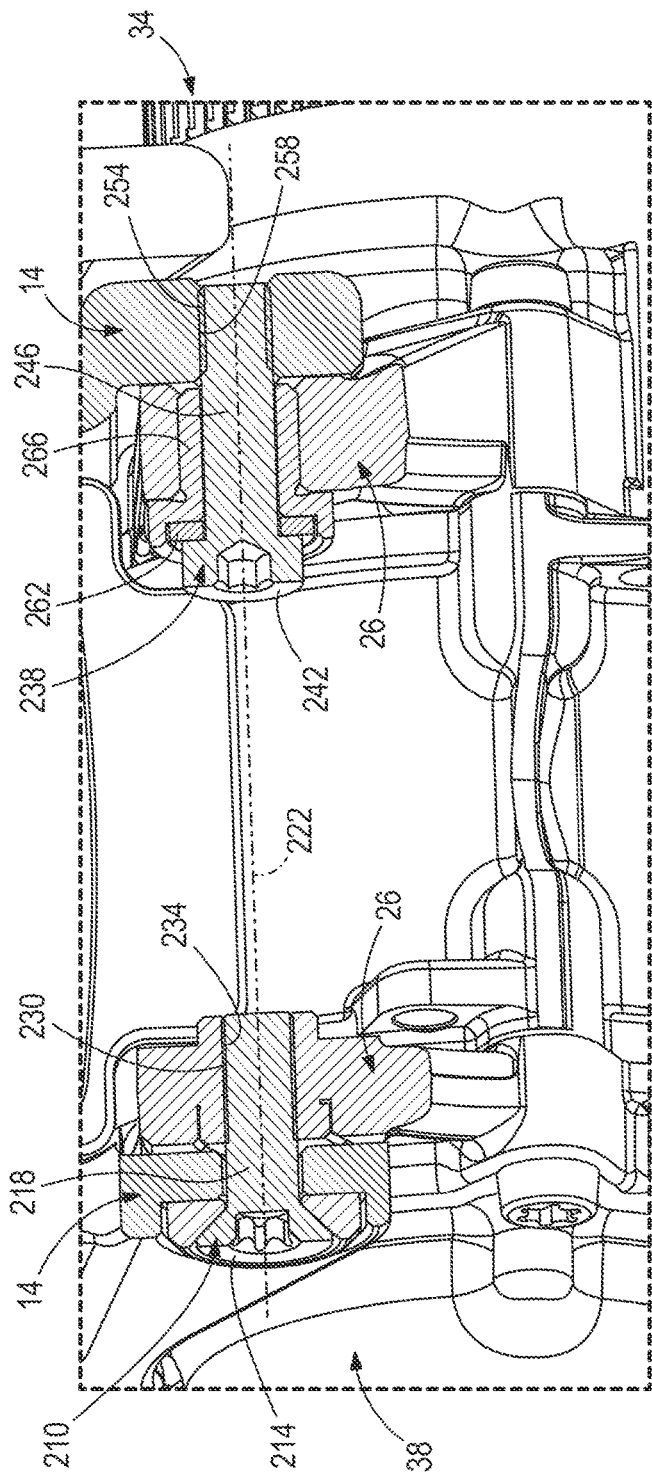
FIG. 18 is a cross-sectional view of the e-bike of FIG. 1, taken along lines 18-18 in FIG. 3.
Figure 19:
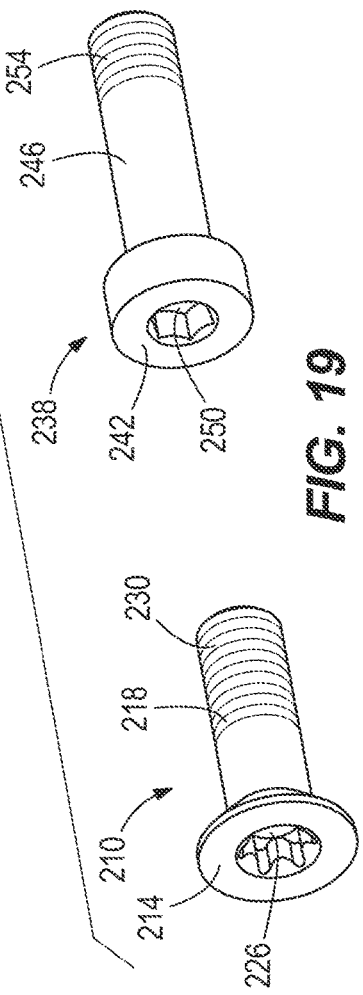
FIG. 19 is a perspective view of motor fasteners of the e-bike of FIG. 1 that are visible in the cross-section of FIG. 18 and are coaxially aligned with one another.

Referring now to FIGS. 3, 18 and 19, in many embodiments, the e-bike 10 can include one or more combinations of fasteners configured and arranged to permit removal and insertion of the fasteners from the same side of the e-bike 10. In some embodiments, these combinations of fasteners (i.e., aligned fasteners) can provide various advantages similar or identical to the fastener-in-fastener arrangements described herein.

For example, referring to FIGS. 18 and 19, the e-bike 10 can include a first motor fastener 210 having a head 214 and an elongate body 218 extending from the head 214. In the assembled state, the elongate body 218 can extend axially away from the head 214 toward the drive side 34 (FIG. 1) along an axis 222 (FIG. 18). In many embodiments, the head 214 can include a drive feature 226 to facilitate rotation of the first motor fastener 210 about the axis 222. In some embodiments, the drive feature 226 can be similar to the drive feature 70, the first drive feature 98, the second drive feature 102, the drive feature 150, the first drive feature 182, or the second drive feature 186. As illustrated at FIG. 19, in some embodiments, the drive feature 226 can include a recessed 6-sided internal poly-lobular drive feature. However, in other embodiments, the drive feature 226 can include any other suitably shaped drive feature (e.g., an internal polygon drive feature, an internal poly-lobular drive feature, etc.) able to receive a tool operable to rotate the first motor fastener 210. Further, in these or still other embodiments, the drive feature 226 can protrude rather than recess.

Referring to FIG. 18, in some embodiments, the first motor fastener 210 can be used to secure the motor assembly 26 to the frame assembly 14 (e.g., at a first frame mount). Thus, the first motor fastener 210 can include an external thread 230 that threads to an internal thread 234 on the motor assembly 26. The frame assembly 14 can be devoid of any threads in this area of the e-bike 10.

Referring again to FIGS. 18 & 19, in many embodiments, the e-bike 10 can include a second motor fastener 238 having a head 242 and an elongate body 246 extending from the head 242. In the assembled state, the elongate body 246 can extend axially away from the head 242 toward the drive side 34 (FIG. 1), along the axis 222 (FIG. 18). In these or other embodiments, the second motor fastener 238 can be coaxially aligned with the first motor fastener 210. In many embodiments, the head 242 can include a drive feature 250 to facilitate rotation of the second motor fastener 238 about the axis 222. In some embodiments, the drive feature 250 can be similar to the drive feature 70, the first drive feature 98, the second drive feature 102, the drive feature 150, the first drive feature 182, the second drive feature 186, or the drive feature 226. As illustrated at FIG. 19, in some embodiments, the drive feature 250 can include a recessed 6-sided internal polygon drive feature (e.g. an internal hexagon drive feature). However, in other embodiments, the drive feature 250 can include any other suitably shaped drive feature (e.g., an internal polygon drive feature, an internal poly-lobular drive feature, etc.) able to receive a tool operable to rotate the second motor fastener 238. Further, in these or still other embodiments, the drive feature 250 can protrude rather than recess.

Referring to FIG. 18, in some embodiments, the second motor fastener 238 can be used to secure the motor assembly 26 to the frame assembly 14 (e.g., at a second frame mount spaced from the first frame mount). Thus, the second motor fastener 238 can include an external thread 254 that threads to an internal thread 258 on the frame assembly 14 (e.g., at a threaded through-hole of the second frame mount). In some embodiments, the e-bike 10 can include a washer 262 and a sleeve 266 that can be used to help align and secure the second motor fastener 238 to the frame assembly 14.

The arrangement and alignment of the first motor fastener 210 and the second motor fastener 238 can allow access to both the first motor fastener 210 and the second motor fastener 238 from the non-drive side 38 of the e-bike 10, such that one or more components along the drive side 34 (e.g., one or more accessory components) do not need to first be removed. For example, once the first motor fastener 210 has been removed, the openings left through the frame assembly 14 and the motor assembly 26 along the non-drive side 38 may be used to insert a tool along the axis 222 toward the drive side 34 until the tool reaches the drive feature 250 of the second motor fastener 238. The second motor fastener 238 may then be removed.

Although the fastener-in-fastener arrangements and aligned fastener arrangements discussed herein are predominantly described in connection with the motor assembly 26, the chainguide 42, and the rockguard 56, in other embodiments, such fastener arrangements can additionally or alternatively be implemented with other components, including other accessory components. Further, such fastener arrangements also can be implemented in connection with manual (e.g., non-electric) bicycles or other mechanical devices (e.g., automobiles, motorcycles, power tools, etc.).

Various features of the invention are set forth in the following claims.

The invention claimed is:

1. An e-bike comprising:
    a frame assembly including a first frame assembly wall and a second frame assembly wall, wherein the second frame assembly wall is spaced apart from the first frame assembly wall along an axis and is located opposite the first frame assembly wall along the axis;
    a first wheel coupled to the frame assembly and supporting the frame assembly;
    a second wheel coupled to the frame assembly and supporting the frame assembly;
    a motor assembly including a first motor assembly wall and a second motor assembly wall, wherein the second motor assembly wall is spaced apart from the first motor assembly wall along the axis and is located opposite the first motor assembly wall along the axis;
    wherein the first motor assembly wall is located between the first frame assembly wall and the second motor assembly wall along the axis, wherein the second motor assembly wall is located between the first motor assembly wall and the second frame assembly wall along the axis, and wherein both the first motor assembly wall and the second motor assembly wall are located between the first frame assembly wall and the second frame assembly wall along the axis;
    a first motor fastener extending into a first aperture in the first frame assembly wall and a second aperture in the first motor assembly wall and securing the motor assembly to the frame assembly; and
    a second motor fastener extending into a third aperture in the second motor assembly wall and a fourth aperture in the second frame assembly wall and securing the motor assembly to the frame assembly;
    wherein the first motor fastener is spaced apart from the second motor fastener by a gap along the axis, wherein the first motor fastener and the second motor fastener are aligned along the axis, wherein the second motor fastener includes a drive feature that is positioned between the first frame assembly wall and the second frame assembly wall, wherein the drive feature is also positioned between the first motor assembly wall and the second motor assembly wall along the axis, and wherein the drive feature is sized to receive a tool sized to pass through the first aperture and the second aperture.

2. The e-bike of claim 1, wherein the first motor fastener includes a first head and a first elongate body extending from the first head along the axis, wherein the second motor fastener includes a second head and a second elongate body extending from the second head along the axis, and wherein the first motor fastener and the second motor fastener are arranged along the axis such that the first elongate body is disposed axially between the first head and the second head, and such that the second head is disposed axially between the first elongate body and the second elongate body.

3. The e-bike of claim 1, wherein the first motor fastener is openly exposed along a first side of the first frame assembly wall.

4. The e-bike of claim 1, wherein the first motor fastener includes a first external thread and the first motor assembly wall includes a first internal thread engaged with the first external thread.

5. The e-bike of claim 4, wherein the second motor fastener includes a second external thread and the second frame assembly wall includes a second internal thread engaged with the second external thread.

6. The e-bike of claim 1, wherein the second motor fastener includes a head, wherein the drive feature is located within the head.

7. The e-bike of claim 1, wherein the first frame assembly wall is a first flange, wherein the second frame assembly wall is a second flange, wherein the first motor assembly wall is a third flange, and wherein the second motor assembly wall is a fourth flange.

8. A bicycle comprising:
    a frame assembly including a first frame assembly wall and a second frame assembly wall, wherein the second frame assembly wall is spaced apart from the first frame assembly wall along an axis and is located opposite the first frame assembly wall along the axis;
    a first wheel coupled to the frame assembly and supporting the frame assembly;
    a second wheel coupled to the frame assembly and supporting the frame assembly;
    a motor assembly including a first motor assembly wall and a second motor assembly wall, wherein the second motor assembly wall is spaced apart from the first motor assembly wall along the axis and is located opposite the first motor assembly wall along the axis;
    wherein the first motor assembly wall is located between the first frame assembly wall and the second motor assembly wall along the axis, wherein the second motor assembly wall is located between the first motor assembly wall and the second frame assembly wall along the axis, and wherein both the first motor assembly wall and the second motor assembly wall are located between the first frame assembly wall and the second frame assembly wall along the axis;
    a first fastener positioned within and secured to both the first frame assembly wall and the first motor assembly wall; and
    a second fastener positioned within and secured to both the second motor assembly wall and the second frame assembly wall;
    wherein the first fastener is spaced entirely from the second fastener by a gap along the axis, wherein the first fastener includes a first head and a first elongate body extending from the first head along the axis, wherein the second fastener includes a second head and a second elongate body extending from the second head along the axis, wherein the first fastener and the second fastener are arranged along the axis such that the first elongate body is disposed axially between the first head and the second head, and such that the second head is disposed axially between the first elongate body and the second elongate body, wherein the first frame assembly wall includes an aperture, and wherein the second fastener includes a drive feature that is positioned between the first frame assembly wall and the second frame assembly wall, wherein the drive feature is also positioned between the first motor assembly wall and the second motor assembly wall along the axis, and wherein the drive feature is sized to receive a tool sized to pass through the aperture.

9. The bicycle of claim 8, wherein the first fastener is openly exposed along a first side of the first frame assembly wall.

10. The bicycle of claim 8, wherein the first frame assembly wall is a first flange, wherein the second frame assembly wall is a second flange, wherein the first motor assembly wall is a third flange, and wherein the second motor assembly wall is a fourth flange.

11. The bicycle of claim 10, wherein the first fastener includes a first external thread and the first motor assembly wall includes a first internal thread engaged with the first external thread.

12. The bicycle of claim 11, wherein the second fastener includes a second external thread and the second frame assembly wall includes a second internal thread engaged with the second external thread.

13. The bicycle of claim 8, wherein the first frame assembly wall includes an aperture to receive the first fastener, wherein the aperture is unthreaded.

14. The bicycle of claim 8, wherein the second motor assembly wall includes an aperture to receive the second fastener, wherein the aperture is unthreaded.

15. A bicycle comprising:
- a frame assembly including a first frame assembly wall and a second frame assembly wall, wherein the second frame assembly wall is spaced apart from the first frame assembly wall along an axis and is located opposite the first frame assembly wall along the axis;
- a first wheel coupled to the frame assembly and supporting the frame assembly;
- a second wheel coupled to the frame assembly and supporting the frame assembly;
- a motor assembly including a first motor assembly wall and a second motor assembly wall, wherein the second motor assembly wall is spaced apart from the first motor assembly wall along the axis and is located opposite the first motor assembly wall along the axis;
- wherein the first motor assembly wall is located between the first frame assembly wall and the second motor assembly wall along the axis, wherein the second motor assembly wall is located between the first motor assembly wall and the second frame assembly wall along the axis, and wherein both the first motor assembly wall and the second motor assembly wall are located between the first frame assembly wall and the second frame assembly wall along the axis;
- a first fastener extending into a first, unthreaded aperture of the first frame assembly wall and a second, threaded aperture of the first motor assembly wall; and
- a second fastener extending into a third, unthreaded aperture of the second motor assembly wall and a fourth, threaded aperture of the second frame assembly wall;
- wherein the second fastener includes a drive feature that is positioned between the first frame assembly wall and the second frame assembly wall, wherein the drive feature is also positioned between the first motor assembly wall and the second motor assembly wall, and wherein the drive feature is sized to receive a tool sized to pass through the first, unthreaded aperture and the second, threaded aperture.

16. The bicycle of claim 15, wherein the first frame assembly wall is a first flange, wherein the second frame assembly wall is a second flange, wherein the first motor assembly wall is a third flange, and wherein the second motor assembly wall is a fourth flange.

17. The bicycle of claim 15, wherein the first fastener includes a first external thread engaged with the second, threaded aperture.

18. The bicycle of claim 17, wherein the second fastener includes a second external thread engaged with the fourth, threaded aperture.

19. The bicycle of claim 15, wherein the second fastener includes a head and wherein the drive feature is positioned in the head.

20. The bicycle of claim 15, wherein the axis extends centrally through each of the first fastener and the second fastener.

* * * * *